United States Patent
Balmin et al.

(10) Patent No.: US 9,836,506 B2
(45) Date of Patent: Dec. 5, 2017

(54) DYNAMIC QUERY OPTIMIZATION WITH PILOT RUNS

(71) Applicant: International Business Machines Corporation, Armonk, NY (US)

(72) Inventors: Andrey Balmin, San Jose, CA (US); Vuk Ercegovac, Campbell, CA (US); Jesse E. Jackson, San Jose, CA (US); Konstantinos Karanasos, Nea Penteli (GR); Marcel Kutsch, San Jose, CA (US); Fatma Ozcan, San Jose, CA (US); Chunyang Xia, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 230 days.

(21) Appl. No.: 14/301,627

(22) Filed: Jun. 11, 2014

(65) Prior Publication Data

US 2015/0363466 A1   Dec. 17, 2015

(51) Int. Cl.
*G06F 17/30* (2006.01)

(52) U.S. Cl.
CPC .. *G06F 17/30466* (2013.01); *G06F 17/30451* (2013.01); *G06F 17/30469* (2013.01)

(58) Field of Classification Search
CPC ......... G06F 17/30442; G06F 17/30445; G06F 17/30474; G06F 17/30466; G06F 17/30451; G06F 17/30469
See application file for complete search history.

(56) References Cited

U.S. PATENT DOCUMENTS

| | | | | |
|---|---|---|---|---|
| 5,335,345 A * | 8/1994 | Frieder | ............ | G06F 17/30474 |
| 6,067,542 A * | 5/2000 | Carino, Jr. | ........ | G06F 17/30445 |
| 6,338,056 B1 * | 1/2002 | Dessloch | .......... | G06F 17/30321 |
| | | | | 707/711 |
| 6,351,742 B1 * | 2/2002 | Agarwal | ........... | G06F 17/30463 |
| 6,353,818 B1 * | 3/2002 | Carino, Jr. | ........ | G06F 17/30463 |
| 6,738,755 B1 * | 5/2004 | Freytag | ............ | G06F 17/30469 |
| 7,593,931 B2 * | 9/2009 | Zuzarte | ............ | G06F 17/30469 |
| 7,774,700 B2 * | 8/2010 | Novoselsky | ........ | G06F 17/2247 |
| | | | | 715/235 |
| 7,984,043 B1 * | 7/2011 | Waas | ................ | G06F 17/30932 |
| | | | | 707/718 |

(Continued)

*Primary Examiner* — Albert Phillips, III
*Assistant Examiner* — Alp Onat
(74) *Attorney, Agent, or Firm* — Cantor Colburn LLP; Bryan W Butler (57) ABSTRACT

In one embodiment, a computer-implemented method includes selecting one or more sub-expressions of a query during compile time. One or more pilot runs are performed by one or more computer processors. The one or more pilot runs include a pilot run associated with each of one or more of the selected sub-expressions, and each pilot run includes at least partial execution of the associated selected sub-expression. The pilot runs are performed during execution time. Statistics are collected on the one or more pilot runs during performance of the one or more pilot runs. The query is optimized based at least in part on the statistics collected during the one or more pilot runs, where the optimization includes basing cardinality and cost estimates on the statistics collected during the pilot runs.

15 Claims, 3 Drawing Sheets

(56) References Cited

U.S. PATENT DOCUMENTS

| | | | |
|---|---|---|---|
| 8,447,754 B2* | 5/2013 | Weissman | G06F 17/30389 707/713 |
| 9,053,210 B2* | 6/2015 | Elnikety | G06F 17/30958 |
| 2006/0218123 A1* | 9/2006 | Chowdhuri | G06F 17/30445 |
| 2007/0050330 A1 | 3/2007 | Karn et al. | |
| 2007/0226186 A1* | 9/2007 | Ewen | G06F 17/30463 |
| 2007/0294678 A1* | 12/2007 | Novoselsky | G06F 17/2247 717/144 |
| 2009/0112792 A1* | 4/2009 | Barsness | G06F 17/30306 |
| 2009/0112799 A1* | 4/2009 | Barsness | G06F 17/30442 |
| 2010/0235347 A1* | 9/2010 | Chaudhuri | G06F 17/30463 707/713 |
| 2011/0258179 A1* | 10/2011 | Weissman | G06F 17/30389 707/714 |
| 2013/0138626 A1* | 5/2013 | Delafranier | G06F 17/30421 707/713 |
| 2013/0238595 A1* | 9/2013 | Weissman | G06F 17/30389 707/713 |
| 2014/0095474 A1* | 4/2014 | Chakkappen | G06F 17/30466 707/718 |
| 2014/0101130 A1* | 4/2014 | Kang | G06F 17/30466 707/714 |
| 2014/0172914 A1* | 6/2014 | Elnikety | G06F 17/30979 707/774 |
| 2014/0195558 A1* | 7/2014 | Murthy | G06F 17/30545 707/770 |
| 2014/0317085 A1* | 10/2014 | Wehrmeister | G06F 17/30463 707/714 |
| 2014/0317088 A1* | 10/2014 | Al-Omari | G06F 17/30463 707/718 |
| 2014/0379690 A1* | 12/2014 | Ahmed | G06F 17/30448 707/713 |
| 2015/0032722 A1* | 1/2015 | Al-Omari | G06F 17/30463 707/718 |
| 2015/0220597 A1* | 8/2015 | Simhadri | G06F 17/30327 707/797 |
| 2015/0248462 A1* | 9/2015 | Theeten | G06F 17/30516 707/688 |
| 2015/0286678 A1* | 10/2015 | Casaletto | G06F 17/30477 707/718 |

* cited by examiner

DYNAMIC QUERY OPTIMIZATION WITH PILOT RUNS

BACKGROUND

Various embodiments of this disclosure relate to query optimization and, more particularly, to using pilot runs (i.e., sample executions) to improve query optimization.

Traditional query optimizers rely on data statistics to estimate predicate selectivity (i.e., the selectiveness or quantity of values selected responsive to a predicate) and cardinality of operators. These estimates are used to select a low-cost execution plan for a given query. Even in the relational setting, optimizers are plagued with incorrect cardinality estimates, mainly due to undetected data correlations, the existence of user-defined functions (UDFs) and other complex predicates, and external variables in parameterized queries. Because UDFs are unknowns to the optimizers, they cannot provide accurate optimizations based on the UDFs. Various solutions have been proposed to capture data correlations, but these require detailed and targeted statistics. Collecting such statistics on all datasets may be prohibitively expensive in some cases, such as in case of large clusters.

The problem of query optimization is further exacerbated in the context of large-scale data platforms, such as Hadoop Distributed File System (HDFS), which have become popular recently. In addition to large data volumes, there are other important characteristics that distinguish query processing in such an environment from traditional relational query processing. For instance, nested data structures, such as structs, maps, and arrays, are pervasive in these environments because users commonly store data in denormalized form. Additionally, users push more complex business logic closer to the data, resulting in heavy usage of UDFs in queries. Such environments are often cloud-based, in which case query optimization plays a crucial role for scheduling as well as pricing purposes.

SUMMARY

In one embodiment of this disclosure, a computer-implemented method includes selecting one or more sub-expressions of a query during compile time. One or more pilot runs are performed by one or more computer processors. The one or more pilot runs include a pilot run associated with each of one or more of the selected sub-expressions, and each pilot run includes at least partial execution of the associated selected sub-expression. The pilot runs are performed during execution time. Statistics are collected on the one or more pilot runs during performance of the one or more pilot runs. The query is optimized based at least in part on the statistics collected during the one or more pilot runs, where the optimization includes basing cardinality and cost estimates on the statistics collected during the pilot runs.

In another embodiment, a system includes a pilot-run unit, a statistics unit, and a cost-based optimizer. The pilot-run unit is configured to select one or more sub-expressions of a query during compile time and to perform, by one or more computer processors, one or more pilot runs. The one or more pilot runs include a pilot run associated with each of one or more of the selected sub-expressions, and each pilot run includes at least partial execution of the associated selected sub-expression. The pilot runs are performed during execution time. The statistics unit is configured to collect statistics on the one or more pilot runs during performance of the one or more pilot runs. The cost-based optimizer is configured to optimize the query based at least in part on the statistics collected during the one or more pilot runs, where the optimization includes basing cardinality and cost estimates on the statistics collected during the pilot runs.

In yet another embodiment, a computer program product for optimizing a query includes a computer readable storage medium having program instructions embodied therewith. The program instructions are executable by a processor to cause the processor to perform a method. The method includes selecting one or more sub-expressions of a query during compile time. One or more pilot runs are performed. The one or more pilot runs include a pilot run associated with each of one or more of the selected sub-expressions, and each pilot run includes at least partial execution of the associated selected sub-expression. The pilot runs are performed during execution time. Statistics are collected on the one or more pilot runs during performance of the one or more pilot runs. The query is optimized based at least in part on the statistics collected during the one or more pilot runs, where the optimization includes basing cardinality and cost estimates on the statistics collected during the pilot runs.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of the disclosed optimization system may provide improved optimization of queries, particularly those queries that incorporate UDFs or other complex predicates. It will be understood that the term "optimize," as used herein does not necessarily refer to finding the most efficient possible way of executing the query but, rather, refers to applying efficient improvements to query execution.

To address the traditional problem of incorrect cardinality estimates, which lead to inefficient execution plans, various embodiments perform optimization techniques at runtime, as opposed to prior to runtime. Some embodiments of the optimization system require no pre-existing statistics, but may be capable of exploiting such statistics when available. When executing a query, the optimization system may make observations regarding the cardinality of various query expressions by operating over a sample of the data in one or more pilot runs, before selecting an execution plan.

Dynamic, adaptive query processing has been extensively studied in relational settings. Further, altering the execution plan at runtime has been considered both in centralized and distributed scenarios, and dynamic techniques have also been proposed for large-scale data platforms. One of the drawbacks of existing solutions, however, is that the initial plan is obtained from the optimizer at compile-time, using base table statistics, and is therefore subject to potential incorrect result size and cost estimation until re-optimization is invoked. This is partially because, at compile time, statistics relating to complex predicates and UDFs are still unknown. Moreover, undetected data correlations can further aggravate the cost estimation errors. With respect to handling complex predicates and UDFs, existing works focus on placing predicates in the right order and position in the execution plan, given that a user provides hints about the selectivity of the predicate. In contrast, embodiments of the present optimization system need not obtain an initial plan at compile time, and may calculate predicate selectivity at runtime through the use of pilot runs, as discussed further below.

Figure 1:
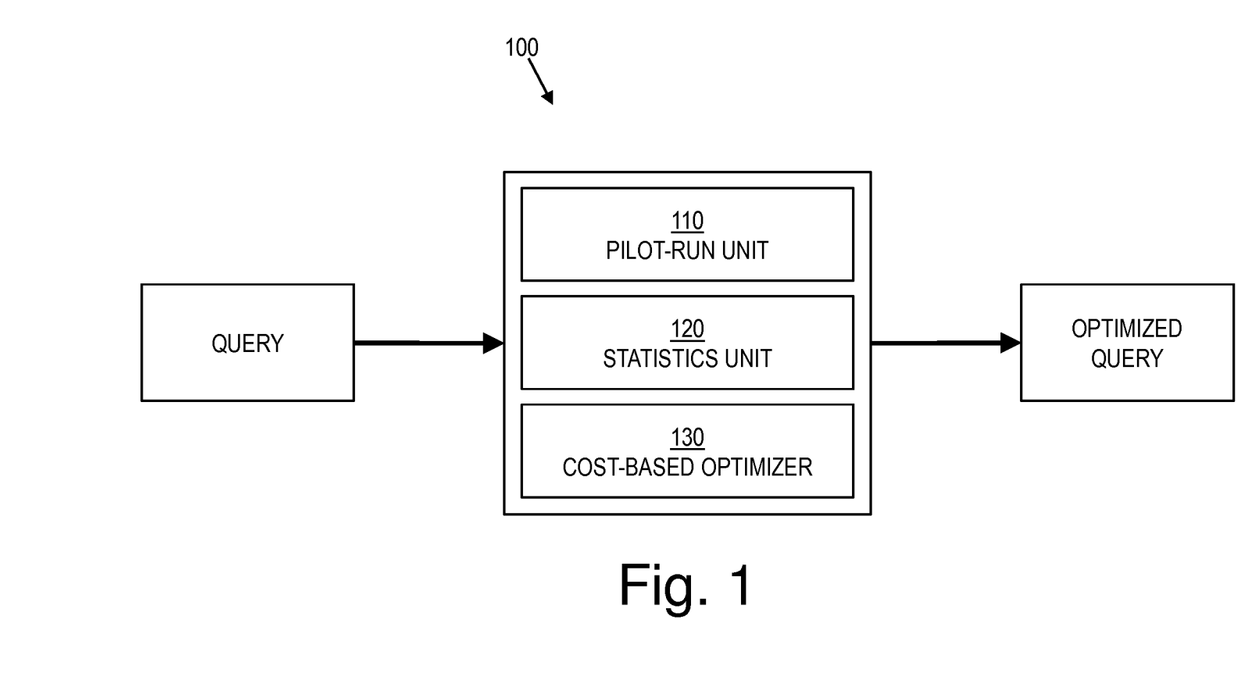
FIG. 1 is a block diagram of an optimization system, according to some embodiments of this disclosure.

FIG. 1 is a block diagram of an optimization system 100, according to some embodiments of this disclosure. As shown, the optimization system 100 may include a pilot-run unit 110, a statistics unit 120, and a cost-based optimizer 130. Each of these units 110, 120, 130 may be made up of hardware, software, or a combination of both. Further, although these units 110, 120, 130 are illustrated as distinct components in FIG. 1, it will be understood that this need not be the case. Rather, the distinction is made for illustrative purposes only, and the units 110, 120, 130 may share hardware, software, or both as needed, based on the specific implementation used.

In general, the pilot-run unit 110 may select sub-expressions of the query for pilot runs, and may perform the pilot runs; the statistics unit 120 may maintain statistics on the base data, including statistics collected during the pilot runs; and the cost-based optimizer 130 may optimize the query for execution given the statistics on hand, including the statistics from the pilot runs. In some embodiments, the cost-based optimizer 130 may be a conventional optimizer, using techniques known in the art to optimize a query based on given statistics.

Some embodiments of the optimization system 100 seek a low-cost, or minimum-cost, execution plan for a given query. At compile time, the optimization system 100 may identify query sub-expressions (i.e., parts of the query) for which the cardinality estimation of a traditional optimizer may lead to significant errors, such as due to UDFs, correlations, or other characteristics; and for which such errors may have a significant impact on execution time. For example, choosing the wrong join method when joining two large relations is more disastrous than when joining two small ones, especially in large-scale clusters where data sizes can be in petabytes. Prior to query execution, the optimization system 100 may evaluate each of the selected pilot runs over a sample of the applicable data, and may collect statistics during the execution. This process is referred to herein as a "pilot run" for the selected sub-expression, and the optimization system 100 may perform a pilot run for each selected sub-expression. In some embodiments, the pilot runs may be performed in parallel, through the use of multiple processors. For instance, when implementing through use of HDFS and MapReduce, each pilot run may be executed using a number of mappers (i.e., processes) on multiple processors. Based on the statistics collected from the pilot runs and, in some embodiments, further based on other pre-existing statistics, the optimization system 100 may select a low-cost plan for execution through use of the cost-based optimizer 130. These operations will be described in more detail below.

Most traditional relational optimizers rely on statistics for estimating the selectivity of operators in a query, for costing alternative execution plans, and for choosing a low-cost plan to be executed. Some of these optimizers use detailed data distribution statistics and can therefore accurately estimate the selectivity of simple predicates. When multiple predicates are applied on a relation, traditional optimizers usually rely on the independence assumption and simply multiply the selectivities of each simple predicate to compute the final selectivity. Unfortunately, the independence assumption does not hold when there are correlations between the attributes used in predicates, and simply multiplying the selectivity of individual predicates leads to significantly underestimated result sizes. Underestimation can result in poorly performing query execution plans. For instance, the optimizer may choose operators that work well only when its operands fit in memory, such as sort-merge-join or broadcast join. Incorrect selectivity estimation is exacerbated in the presence of complex predicates or UDFs, or when the predicates involve complex data types, such as arrays and structs.

Some embodiments of the optimization system 100 may use HDFS, as mentioned above. In that case, data may be stored in HDFS and can then be directly queried, without a physical data design step, as in the case of traditional databases. Even if an optimization system provide utilities to collect statistics, such as a "run stats" utility; users may not invoke it. Thus, it may be an improvement over the existing art for the optimization system 100 to have the capability of performing pilot runs when there are no existing statistics.

As an example, consider the following example query, which requests names of some restaurants in California with zip code 94301, having positive reviews.

SELECT rs.name
FROM restaurant rs, review rv, tweet t
WHERE rs.id=rv.rsid AND rv.tid=t.id
AND rs.addr[0].zip=94301 AND rs.addr[0].state=CA
AND sentanalysis(rv)=positive AND checkid(rv,t)

In this example, a UDF is used to determine whether a review is positive. Each restaurant can have multiple addresses, so the array of addresses, addr, is an array type. This query, however, is interested in only the primary address of each restaurant, which is why addr[0] is being examined. The reviews are joined with tweets, and a second UDF, checkid, is applied to verify that identity of a reviewing user matches the identity of a user who tweeted.

In the above example, there is a correlation between the two address predicates. Specifically, the predicate indicating the state of California is redundant because all restaurants with the given zip code are in California. In this case, even if a traditional optimizer can handle the array datatype, the independence assumption would lead to the wrong selectivity estimation, since it would be assumed that these two predicates are independent of each other. Further, the selectivity of the two UDFs cannot be computed by most relational optimizers, which have no information about how the UDFs are executed. Some relational optimizers may receive basic statistics from users about UDFs, but even those perform poorly given high UDF complexity. Additionally, due to data correlations between relations that will be joined, the optimizer may misestimate the cardinality of join operators.

To account for such non-trivial predicates and UDFs in a query, as well as correlations between the relations that are to be joined, the optimization system 100 may employ the above-mentioned pilot runs.

At compile time, the optimization system 100 may identify sub-expressions of the query that may cause significant errors to selectivity estimation. Among those sub-expressions, some embodiments are more interested in the ones that have a more significant impact on the query (e.g., sub-expressions with large relations). For example, and not by way of limitation, the optimization system 100 may select all UDFs for pilot runs, all sub-expressions involving relations over a predetermined size, or all UDFs as well as all sub-expressions involving relations over a predetermined size. At runtime, the optimization system 100 may perform pilot runs. In other words, at run-time, the optimization system 100 may evaluate the sub-expressions selected at compile time over a sample of the data. That sample may be selected by various mechanisms, such as being a random selection of a predetermined percentage of data within the relation. It will be understood that various sampling mechanisms known in the art may be used, such as, for example, adaptive sampling.

In some embodiments, one or more pilot runs may be performed at intermediate points during the execution of the query, in lieu of or in addition to performing pilot runs at the beginning of execution. This may allow complex predicates and UDFs involving columns from multiple tables and joins to be executed in pilot runs. For instance, in the above example query, a UDF refers to columns from multiple tables. At this intermediate point, after the joining occurs, the optimization system 100 may then perform a pilot run. Through the use of intermediate pilot runs, the optimization system may achieve dynamic, adaptive query optimization.

Returning to the above example query, two of the pilot runs that may be executed in this example are the following: one for rv, applying the sentanalysis UDF; and one that joins samples of relations rs and rv, after applying the two predicates on addr[0] of rs.

During execution of the pilot runs, the optimization system 100 may collect statistics, and may then invoke the cost-based optimizer 130 to operate based on those statistics. The cost-based optimizer 130, which may be a traditional optimizer, may use techniques known in the art to optimize queries based on known applicable statistics, including the statistics collected during the pilot runs. Thus, after the pilot runs according to this disclosure have been performed, and the resulting statistics have been gathered, the cost-based optimizer 130 may optimize the query according to mechanisms already known in the art. During the optimization through the cost-based optimizer 130, whenever the optimization system 100 needs to estimate the cardinality of a sub-expression that participated in a pilot run, the optimization system 100 may use the statistics that were collected by the pilot runs, thus improving cardinality estimates. Thus, for those sub-expressions that are prone to cardinality errors, the optimization system may rely on the observed statistics and not on the formulas otherwise used by the cost-based optimizer 130.

To avoid performing unnecessary pilot runs in cases where the optimization system 100 previously collected statistics for a specific sub-expression in a previous execution of a query, the optimization system 100 may associate collected statistics with expression signatures, each corresponding to a sub-expression. The collected statistics and associated expression signatures may be stored in a database metastore. Thus, before executing a set of pilot runs for a sub-expression, the optimization system 100 may search for existing statistics in the database metastore using the corresponding expression signature, and may perform the set of pilot runs only in the absence of such statistics. This check may save time in cases of recurring queries, or when the same sub-expressions appear in different queries.

In some embodiments, the optimization system 100 need not consider arbitrary query sub-expressions. Rather, the optimization system 100 may apply the predicates and UDFs of each relation R over sample data of that relation R, and may collect statistics based on the resulting output. Given a query Q, with R being the set of relations in Q, the optimization system 100 may parse the query and perform some or all possible predicate and UDF push-downs. The optimization system 100 may then collect the leaf expressions of Q, i.e., the scans for each relation in R together with the predicates and UDFs that appear immediately above the scans. It will be understood that there is one leaf expression for each relation r∈R, denoted $lexp_R$. The optimization system 100 may then transform each $lexp_R$ over a sample of R until k tuples have been output by the filter, or the optimization system 100 has finished scanning R, whichever occurs first. The statistics that are collected during the execution of $lexp_R$ may be added to the statistics metastore for future use.

When the input relation is small, the whole input relation may need to be consumed before outputting k tuples. In that case, the optimization system 100 may cache the output of the pilot run and use it during the actual evaluation of the query, instead of running the corresponding sub-expression for a second time during execution. This is beneficial especially for expensive predicates and UDFs that take a considerable amount of time to be executed. Taking this a step further, in these cases, if a pilot run is close to consuming the entire input when k tuples have been output (e.g., 80% of the base relation has been scanned), the optimization system 100 may let the pilot run complete (i.e., reach 100%) to be able to reuse the output when the query is executed.

As mentioned above, the pilot runs may be executed in parallel using multiple processors. More specifically, some embodiments of the optimization system 100 may be implemented on a MapReduce or Tez infrastructure, using HDFS, or the optimization system 100 may be implemented in a cloud infrastructure. MapReduce may enable the optimization system 100 to run the pilot runs in parallel, while HDFS may allow any node in a cluster to access to all the data, thus facilitating the parallelization. Files are divided into blocks and replicated and distributed in the cluster. It will be understood, however, that other architectures may also be appropriate for various embodiments of the optimization system 100.

Figure 2:
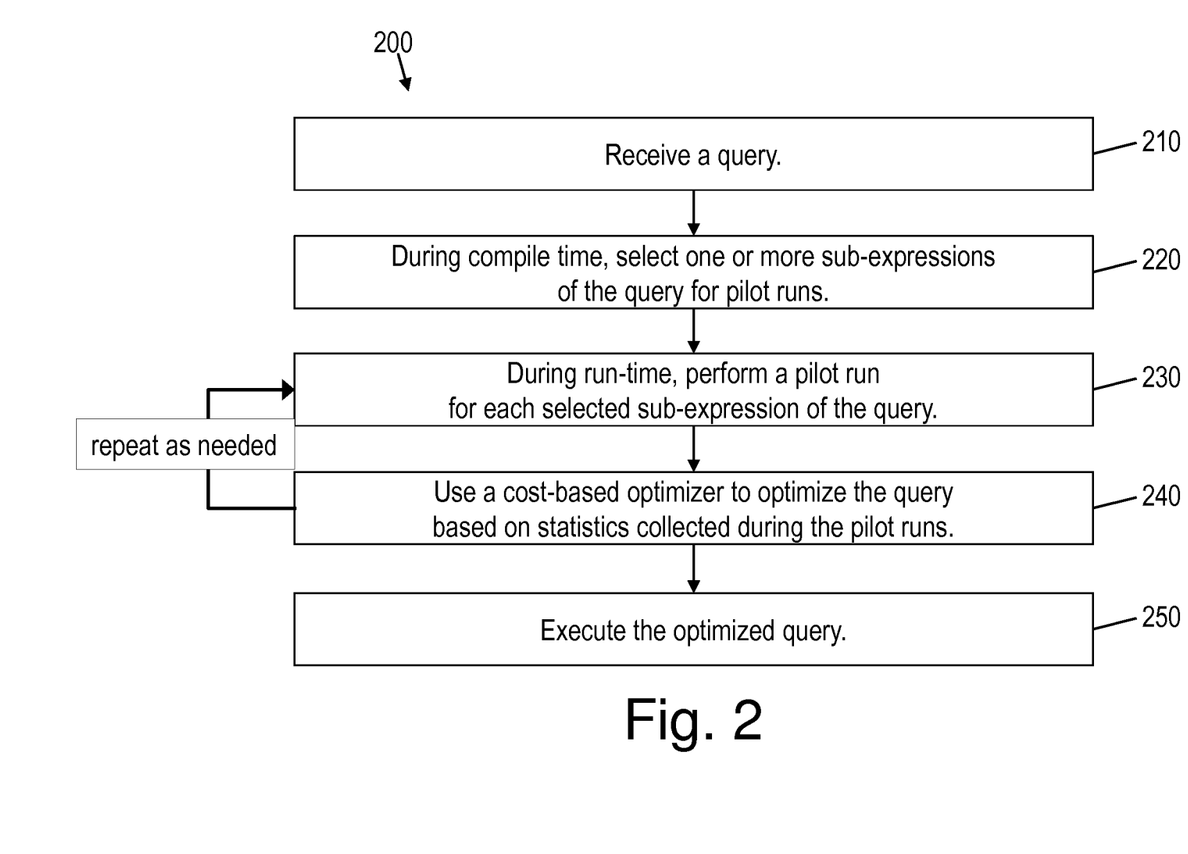
FIG. 2 is a flow diagram of a method for optimizing a query, according to some embodiments of this disclosure.

FIG. 2 is a flow diagram of a method 200 for optimizing a query, according to some embodiments of this disclosure. As shown, at block 210, a query is received. At block 220, during compile time, the optimization system 100 may select one or more sub-expressions for the query for pilot runs. At block 230, during run-time, a pilot run is performed for each selected sub-expression, and statistics about the pilot runs are collected and stored. As discussed above, in some embodiments, the pilot runs may be executed in parallel across multiple processors. Further, in some embodiments, the pilot runs may occur at the beginning of execution, at one or more intermediate points, or at the beginning as well as at one or more intermediate points. At block 240, the cost-based optimizer 130 optimizes the query based on the collected statistics. Blocks 230 and 240 may be repeated as needed, to perform pilot runs and optimize at intermediate point. At block 250, the optimized query is executed. It will be understood that other methods may also be in accordance with this disclosure.

Figure 3:
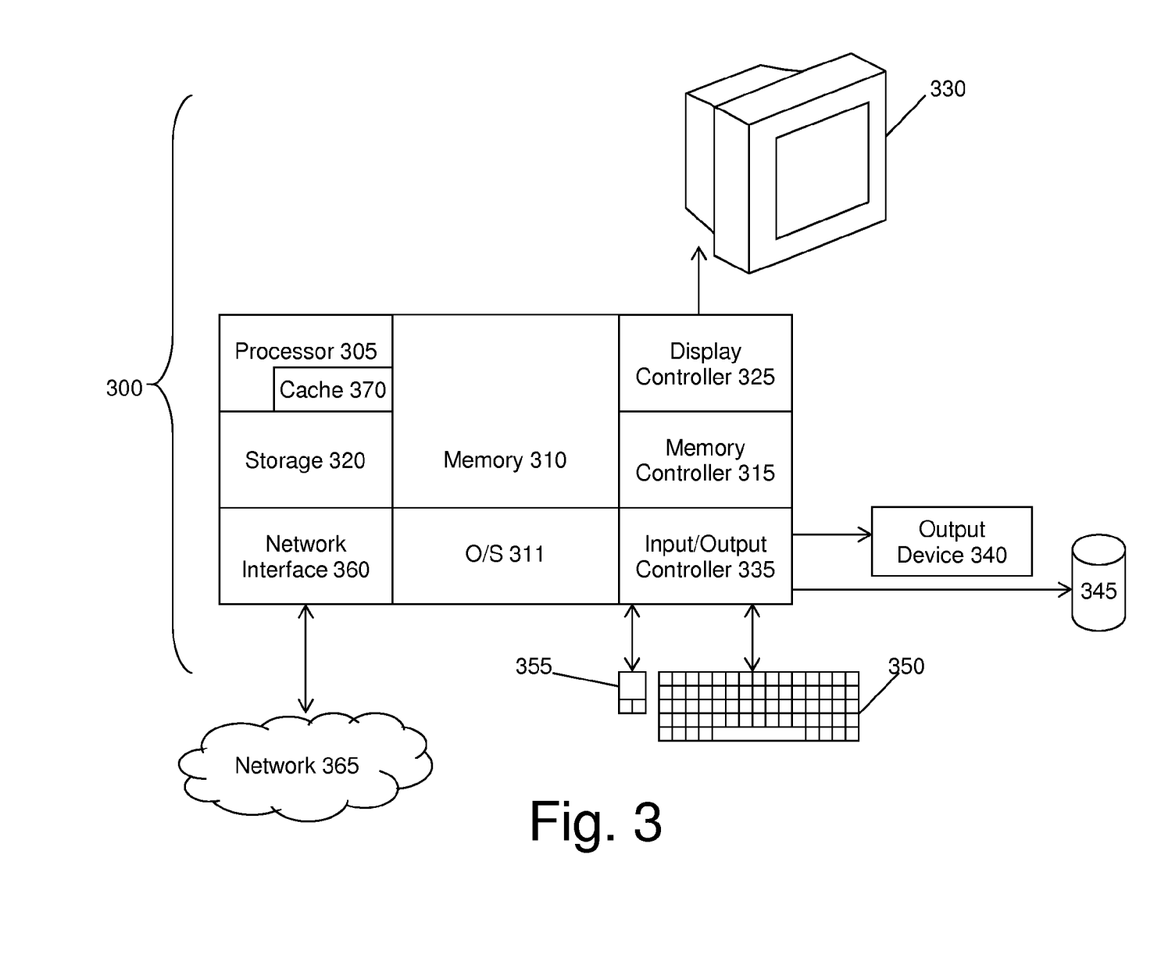
FIG. 3 is a block diagram of a computer system for implementing some or all aspects of the optimization system, according to some embodiments of this disclosure.

FIG. 3 illustrates a block diagram of a computer system 300 for use in implementing an optimization system 100 or method according to some embodiments. The optimization systems 100 and methods described herein may be implemented in hardware, software (e.g., firmware), or a combination thereof. In an exemplary embodiment, the methods described may be implemented, at least in part, in hardware and may be part of the microprocessor of a special or general-purpose computer system 300, such as a personal computer, workstation, minicomputer, or mainframe computer.

In an exemplary embodiment, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. A conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be any custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the optimization systems 100 and methods of this disclosure.

The computer system 300 may further include a display controller 325 coupled to a display 330. In an exemplary embodiment, the computer system 300 may further include a network interface 360 for coupling to a network 365. The network 365 may be an IP-based network for communication between the computer system 300 and any external server, client and the like via a broadband connection. The network 365 transmits and receives data between the computer system 300 and external systems. In an exemplary embodiment, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Optimization systems 100 and methods according to this disclosure may be embodied, in whole or in part, in computer program products or in computer systems 300, such as that illustrated in FIG. 3.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
selecting, during compile time of a query, one or more user-defined functions (UDFs) for which to perform one or more pilot runs;
performing, by one or more computer processors, during the execution of the query and after completion of the compile time of the query, the one or more pilot runs of the one or more UDFs, comprising a pilot run associated with each of the one or more UDFs, and wherein each pilot run comprises at least partial execution of the associated UDF selected during compile time of the query and before execution of the query;
collecting statistics on the one or more pilot runs of the one or more UDFs during performance of the one or more pilot runs of the one or more UDFs; and
optimizing the query, after execution of the query begins, wherein the optimizing comprises:
determining, during the execution of the query, an order of execution for predicates in the query based at least on part on the statistics on the one or more pilot runs of the one or more UDFs;
wherein the statistics comprise information about performance of the one or more UDFs, and wherein the optimizing further comprises basing cardinality and cost estimates on the statistics collected during the one or more pilot runs of the one or more UDFs.

2. The method of claim 1, wherein performing the one or more pilot runs of the one or more UDFs comprises performing two or more pilot runs in parallel across two or more processors.

3. The method of claim 1, further comprising storing, in a database metastore, the statistics collected during the one or more pilot runs of the one or more UDFs, wherein the statistics collected during a first pilot run associated with a first UDF are stored in the database metastore in association with a first expression signature identifying the first UDF.

4. The method of claim 1, wherein the one or more UDFs comprise a first UDF, and wherein performing the one or more pilot runs of the one or more UDFs comprises:
searching a database metastore for previous pilot-run data related to the first UDF; and
performing a first pilot run associated with the first UDF if the previous pilot run data related to the first UDF is not found in the database metastore.

5. The method of claim 4, wherein the one or more UDFs further comprise a second UDF, and wherein performing the one or more pilot runs of the one or more UDFs comprises:
searching the database metastore for previous pilot-run data related to the second UDF; and
opting not to perform a pilot run associated with the second UDF if the previous pilot run data related to the second UDF is found in the database metastore.

6. A system comprising:
a memory having computer readable instructions; and
one or more processors for executing the computer readable instructions, the computer readable instructions comprising:
selecting, during compile time of a query, one or more user-defined functions (UDFs) for which to perform one or more pilot runs; and
performing, during the execution of the query and after completion of the compile time of the query, the one or more pilot runs of the one or more UDFs, comprising a pilot run associated with each of the one or more UDFs, and wherein each pilot run comprises at least partial execution of the associated UDF selected during compile time of the query and before execution of the query;
collecting statistics on the one or more pilot runs of the one or more UDFs during performance of the one or more pilot runs of the one or more UDFs; and
optimizing the query, after execution of the query begins, wherein the optimizing comprises:
determining, during the execution of the query, an order of execution for predicates in the query based at least on part on the statistics on the one or more pilot runs of the one or more UDFs;
wherein the statistics comprise information about performance of the one or more UDFs, and wherein the optimizing further comprises basing cardinality and cost estimates on the statistics collected during the one or more pilot runs of the one or more UDFs.

7. The system of claim 6, wherein performing the one or more pilot runs of the one or more UDFs comprises performing two or more pilot runs in parallel across two or more processors.

8. The system of claim 6, the computer readable instructions further comprising storing, in a database metastore, the statistics collected during the one or more pilot runs of the one or more UDFs, wherein the statistics collected during a first pilot run associated with a first UDF are stored in the database metastore in association with a first expression signature identifying the first UDF.

9. The system of claim 6, wherein the one or more UDFs comprise a first UDF, and wherein performing the one or more pilot runs of the one or more UDFs comprises:
searching a database metastore for previous pilot-run data related to the first UDF; and
performing a first pilot run associated with the first UDF if the previous pilot run data related to the first UDF is not found in the database metastore.

10. The system of claim 9, wherein the one or more UDFs further comprise a second UDF, and wherein performing the one or more pilot runs of the one or more UDFs comprises:
searching the database metastore for previous pilot-run data related to the second UDF; and
opting not to perform a pilot run associated with the second UDF if the previous pilot run data related to the second UDF is found in the database metastore.

11. A computer program product for optimizing a query, the computer program product comprising a computer readable storage medium having program instructions embodied therewith, the program instructions executable by a processor to cause the processor to perform a method comprising:
selecting, during compile time of a query, one or more user-defined functions (UDFs) for which to perform one or more pilot runs;
performing, during the execution of the query and after completion of the compile time of the query, the one or more pilot runs of the one or more UDFs, comprising a pilot run associated with each of the one or more UDFs, and wherein each pilot run comprises at least partial execution of the associated UDF selected during compile time of the query and before execution of the query;

collecting statistics on the one or more pilot runs of the one or more UDFs during performance of the one or more pilot runs of the one or more UDFs; and optimizing the query, after execution of the query begins, wherein the optimizing comprises:

determining, during the execution of the query, an order of execution for predicates in the query based at least on part on the statistics on the one or more pilot runs of the one or more UDFs;

wherein the statistics comprise information about performance of the one or more UDFs, and wherein the optimizing further comprises basing cardinality and cost estimates on the statistics collected during the one or more pilot runs of the one or more UDFs.

12. The computer program product of claim 11, wherein performing the one or more pilot runs of the one or more UDFs comprises performing two or more pilot runs in parallel across two or more processors.

13. The computer program product of claim 11, the method further comprising storing, in a database metastore, the statistics collected during the one or more pilot runs of the one or more UDFs, wherein the statistics collected during a first pilot run associated with a first UDF are stored in the database metastore in association with a first expression signature identifying the first UDF.

14. The computer program product of claim 11, wherein the one or more UDFs comprise a first UDF, and wherein performing the one or more pilot runs of the one or more UDFs comprises:

searching a database metastore for previous pilot-run data related to the first UDF; and performing a first pilot run associated with the first UDF if the previous pilot run data related to the first UDF is not found in the database metastore.

15. The computer program product of claim 14, wherein the one or more UDFs further comprise a second UDF, and wherein performing the one or more pilot runs of the one or more UDFs comprises:

searching the database metastore for previous pilot-run data related to the second UDF; and opting not to perform a pilot run associated with the second UDF if the previous pilot run data related to the second UDF is found in the database metastore.

* * * * *